(12) United States Patent  
Gentile

(10) Patent No.: US 6,926,339 B2  
(45) Date of Patent: Aug. 9, 2005

(54) APPARATUS AND METHOD FOR PROTECTION OF A VEHICLE EXTERIOR PORTION

(76) Inventor: Edward Gentile, P.O. Box 333, Cedarhurst, NY (US) 11516

( * ) Notice: Subject to any disclaimer, the term of this patent is extended or adjusted under 35 U.S.C. 154(b) by 0 days.

(21) Appl. No.: 10/662,899

(22) Filed: Sep. 15, 2003

(65) Prior Publication Data

US 2004/0124661 A1 Jul. 1, 2004

(51) Int. Cl.$^7$ .............................................. B60R 13/04
(52) U.S. Cl. ................................................ 296/136.07
(58) Field of Search ................................... 296/136.07

(56) References Cited

U.S. PATENT DOCUMENTS

| | | | | |
|---|---|---|---|---|
| 4,997,229 A | * | 3/1991 | Swanson | 296/136.08 |
| 5,050,925 A | | 9/1991 | Brown | 296/136 |
| 5,127,974 A | | 7/1992 | Tomiyama | 156/85 |
| 5,280,989 A | | 1/1994 | Castillo | 296/136 |
| 5,618,073 A | | 4/1997 | Criscione | 293/142 |
| 5,620,764 A | | 4/1997 | Schwarz | 428/39 |
| 5,696,199 A | | 12/1997 | Senkus | 524/548 |
| 5,888,615 A | | 3/1999 | Mascarenhas | 428/141 |
| 5,931,522 A | | 8/1999 | Roskey | 296/136 |
| 5,944,347 A | | 8/1999 | Pechman | 280/770 |
| 5,945,194 A | | 8/1999 | Pester | 428/120 |
| 5,975,621 A | | 11/1999 | Lefevre | 296/136 |
| 5,997,670 A | | 12/1999 | Walter | 156/71 |
| 6,062,629 A | | 5/2000 | Gentile | 296/136 |

* cited by examiner

Primary Examiner—Dennis H. Pedder

(57) ABSTRACT

A protective apparatus intended to be applied to an exterior portion of a vehicle, including a method for such application. The invention is a series of sheets or panels affixed to previously-determined places along the front nose of a vehicle to protect the paint and finish located at such areas. Specifically, the sheets are constructed of a polyvinyl chloride material in the preferred mode, and may be designed to be placed beneath a halter or "bra" cover of a vehicle, so as to protect the paint from damage caused by the halter. Such damage is commonly due to the vinyl, plastic, nylon, or cotton halter constantly rubbing against the vehicle exterior during vibration and wind. Thus, strips or pieces of the polyvinyl chloride material are specially placed upon the vehicle to provide a much-needed barrier between the halter and paint. Similarly, strips or pieces of the polyvinyl chloride material may also be placed as barriers between any other existing vehicle protection device and the vehicle itself. Finally, such strips or pieces may be adhered to the vehicle by the method of static cling, wherein electrostatic properties of the material allow the same to tightly engage the vehicle surface absent the usage of adhesives. As such, the adhesion method allows the polyvinyl chloride strips to be removed from the vehicle and re-used in a convenient manner.

10 Claims, 2 Drawing Sheets

APPARATUS AND METHOD FOR PROTECTION OF A VEHICLE EXTERIOR PORTION

BACKGROUND OF THE INVENTION

The present invention is related to a protective apparatus intended to be applied to an exterior portion of a vehicle, including a method for such application.

1. Field of the Invention

The present invention is a protective apparatus intended to be applied to an exterior portion of a vehicle, including a method for such application. More particularly, in the preferred mode, the invention is a series of polyvinyl chloride sheets or panels affixed to previously-determined places along the vehicle to protect the paint and finish located at such areas. In one specific application of the above, such panels are designed to be placed beneath a halter or "bra" cover of a vehicle, so as to protect the paint from damage caused by the halter. Such damage is commonly due to the vinyl, plastic, nylon, or cotton halter constantly rubbing against the vehicle exterior during vibration and wind. Thus, strips or pieces of the polyvinyl chloride material are specially placed upon the vehicle to provide a much-needed barrier between the halter and paint. Similarly, strips or pieces of the polyvinyl chloride material may also be placed as barriers between any other existing vehicle protection device and the vehicle itself. Finally, such strips or pieces may be adhered to the vehicle by the method of static cling, wherein electrostatic properties of the material allow the same to tightly engage the vehicle surface absent the usage of adhesives. As such, the adhesion method allows the strips to be removed from the vehicle and re-used conveniently.

2. Description of the Prior Art

Numerous innovations for vehicle protective devices have been provided in the prior art that are described as follows. Even though these innovations may be suitable for the specific individual purposes to which they address, they differ from the present invention as hereinafter contrasted. The following is a summary of those prior art patents most relevant to the invention at hand, as well a description outlining the differences between the features of the present invention and those of the prior art.

1. U.S. Pat. No. 5,280,989, issued to Castillo, titled "Static Cling Vinyl Halter Type Cover For Vehicle Front Protection"

In the patent to Castillo, an improved halter type protective cover is constructed out of static cling vinyl cut to fit over the front part of the hood and front fenders of a car to protect the finish from dirt, bug stains, road grime, tar, flying particles, stones and similar damaging material. It is fastened to the front end by means of the electrostatic properties of the material and without the use of adhesives.

2. U.S. Pat. No. 5,975,621, issued to Lefevre, titled "Vehicle Hood Shield"

The patent to Lefevre covers a hood shield for motor vehicles and the like comprises a layer of flexible, magnetically impregnated material to which is contiguously bonded a soft emulsion layer, the whole being cut in the general shape of a vehicle hood and including V-shaped cuts along the rearward edge thereof to facilitate placement onto a vehicle hood without bunching. Elongate edge trim material, including an inner flap thereof to facilitate imposition of a forced fit, is used to hold together the outer edge of the hood shield and the outer edge of the hood. Closing of the hood holds said edge trim material with enclosed hood shield edge against the remainder of the vehicle thereby inhibiting theft of the device.

3. U.S. Pat. No. 5,945,194, issued to Pester, titled "Fender Cover"

In the patent to Pester, a fender cover includes a generally planar sheet of resilient, flexible, pliant, water-impervious material with a plurality of pockets formed along one edge. The pockets are filled with a high density deformable flowable material such as sand, and are separated by flat valleys, to permit folding of the sheet between the pockets. A first ridge is formed in the sheet proximal the pockets in extending between the side edges, and projecting upwardly from the sheet. A second ridge is formed parallel and rearwardly of the first ridge and also extends from side edge to side edge. Both ridges are preferably formed of loops of the material, gathered together and affixed in a loop. Each ridge forms a hinge-type joint permitting pivotal movement of the pockets to a position generally perpendicular to the sheet at a location rearward of the ridge.

4. U.S. Pat. No. 5,944,347, issued to Pechman, titled "Automobile Hood Cover"

In the patent to Pechman, an automobile hood cover is comprised of a flexible planar substrate of vinyl coated fabric or other plastic material, which substrate has substantially all of its exterior (outwardly facing) surface covered with protective and decorative lace means, namely, either lace cloth or lace indicia. The cloth or indicia form a lace pattern comprised of regularly recurring sets of discrete graphical motifs.

5. U.S. Pat. No. 5,618,073, issued to Criscione, titled "Automobile Rear Bumper Protector"

The Criscione invention is a protective cover for covering the outer surface of a rear bumper of a motor vehicle. The protective cover may consist of a single panel of flexible material, or, alternatively, two panels of flexible material and a central portion formed from a transparent polymer that provides visual access to a rear license plate that may be located in a recess formed in the rear bumper. The protective cover is secured in place across the rear bumper by straps that are looped through attachment handles affixed to the motor vehicle's rear wheel.

6. U.S. Pat. No. 5,050,925, issued to Brown, titled "Vehicle Protective Cover"

The Brown invention is a removable protective padding for preventing chips, dents, scrapes and nicks to the doors and sides of a parked vehicle which is covered by this protective padding. This padding will extend from just front of the front door edge to just in front of the rear wheel well. It is held in position by magnets. The height of the protective pad is typically about twenty inches and covers only the area most susceptible to damage from the opening of doors of adjacently parked vehicles. The plastic is a clear plastic such as polyvinyl chloride. It is placed on the car side when it is parked and is removed when it is to be driven.

7. U.S. Pat. No. 5,997,670, issued to Walter, titled "Method And Apparatus For Applying Self-Adhesive Protective Sheeting To Vehicle Bodies"

The Walter patent discloses a method and apparatus for automatically applying self-adhesive protective sheeting to surface parts of vehicle bodies, a specific rectangular piece of protective sheeting in the form of stock roll is grasped on its non-adhesive side, using a robot-controlled tentering frame with suction legs, is drawn off and is cut off. Before the sheeting blank is laid on to the body, in the freely stretched-out state tear-off lines are perforated, preferably from the non-adhesive sheeting side, in the region of accessory parts by means of a perforating device guided along definite contour lines. Thereafter the protective sheeting, which is thus prepared and stretched out so as to be free of creases in the tentering frame, is lowered in the correct position onto the associated part by the handling robot and laid onto the surface part so as to be free of bubbles. The sheetings are subsequently pressed down in a brushing manner under an elastic brushing bar extending over the entire vehicle width. In the region of glued-over gaps in the vehicle body surface, the protective sheeting is severed and the cut edges are pressed down. In the region of accessory parts, protective sheeting parts are drawn off along the perforated tearing lines and openings are thus made in said regions in a manner appropriate for assembly.

8. U.S. Pat. No. 5,931,522, issued to Roskey, titled "Magnetic Motor Vehicle Body Protection Apparatus And Method Of Use Of The Same"

In the patent to Roskey, a magnetic motor vehicle body protection apparatus includes a sheet of flexible magnetic material of a thickness capable of being cut with scissors. Markings are provided on the sheet providing an outline of a portion of a body of an motor vehicle. The sheet is cut to size and magnetically adhered to a panel section of a vehicular body with the sheet substantially contiguous with that portion of the vehicular body being covered, such that any scrape or blow to that portion of the body is absorbed by the sheet.

9. U.S. Pat. No. 5,127,974, issued to Tomiyama, titled "Method Of Protecting Coating Film"

In the patent to Tomiyama, disclosed is a method of temporarily protecting a surface of a top coating of a coating finished automobile, which method comprieses (A) adhering a plastic film having a releasable pressure-sensitive adhesive layer to a body surface of the coating finished automobile and/or (B) heating a heat-shrinkable plastic film to be shrinked so as to fit to an intended shape and to cover the body surface of the coating finished automobile; which method comprises applying to the body surface of the coating finished automobile a plastic film prepared by intermittently coating a releasable pressure-sensitive adhesive layer to cover the body surface of the coating finished automobile; which method comprises covering the, body surface of the coating finished automobile with a plastic film having a rough surface on a side contacting with a coating surface, and fixing a terminal of the film and heating, when needed, to cover in conformity with a body shape; and which method comprises subjecting a plastic film to vacuum forming to cover a body surface of the coating finished automobile in conformity with the body shape.

10. U.S. Pat. No. 5,696,199, issued to Senkus, titled "Pressure-Sensitive Adhesive Polyacrylate Polymer And Method Of Making"

The Senkus invention is a fluid permeable composite structure having active particulate bonded together using a pressure-sensitive adhesive (PSA) polymer microparticulate. Use of the PSA polymer microparticulate to bond the active particulate together produces a bonded structure that, unlike previously-developed active bonded structures, is flexible and therefore can be conformed into a variety of shapes. The shaped structures may be used as gaseous filters in a wide variety of respirators.

11. U.S. Pat. No. 5,888,615, issued to Mascarenhas, titled "Cling Films And Articles"

The Mascarenhas invention relates to an ink-imprinted and reusable multilayer cling film of at least one layer in combination with a substrate having a rigid smooth surface comprising a non-vinyl flexible polymer cling film which has two smooth surfaces, is substantially free of added plasticizer and provides a 180 degree. peel force after application to glass of from about 30 to about 2500 gms after aging in a 140 degree. F. oven for 72 hours. In another embodiment, the invention relates to an ink-printed and reusable multilayer cling film of at least two layers which can cling to substrates having a rigid smooth surface without the use of an adhesive material. For example, such multilayer cling film may comprise: a first layer of at least one thermoplastic polymer film having an ink-imprinted upper surface and a smooth lower surface; and a second layer which is a polymeric cling film having an upper surface and a lower surface and comprising at least one non-vinyl thermoplastic elastomer wherein the upper surface of the second layer is in contact with and adhered to the lower surface of the first layer.

12. U.S. Pat. No. 5,620,764, issued to Schwarz, titled "Interactive Wall Covering System"

The patent to Schwarz illustrates an interactive wall covering system having at least one substrate sheet and at least one non-adhesive applique which is easily mounted on and easily removed from the substrate sheet. The applique is made of an electrostatic cling material. The substrate sheet has one face receptive to an adhesive for permanently mounting the substrate sheet to a wall. The substrate sheet also has a second face receptive to an electrostatic cling material.

The aforementioned prior art patents that relate to vehicle-covering items mostly cover entire noses, hoods, or other large panels of the vehicle. Methods of adhering such items to the vehicle further entail the usage of magnets and other traditional fasteners. Although certain prior art devices utilize static cling as a means of attachment, such items are typically large sheets or panels that cover general, wide areas of the vehicle.

In contrast to the above, the present invention is a series of strips constructed of a polyvinyl chloride material, which may be specially designed to be placed beneath a halter or "bra" cover of a vehicle, so as to protect the paint from damage caused by the halter due to vibration and wind. Such strips are specifically placed upon the vehicle to provide a much-needed barrier between the halter and vehicle paint, and are adhered to the vehicle by static cling, wherein electrostatic properties of the strips allow the same to engage the vehicle surface absent without using adhesives. Likewise, strips of the polyvinyl chloride material can be placed between other vehicle protection devices and the vehicle, forming a barrier for protection of the paint. Examples of the same are existing mud flaps and molded pieces that protect the vehicle surface from rocks and debris. Thus, the strips function to effectively cover any areas of the vehicle previously left unprotected, and may even be removed from the vehicle and re-used in a convenient manner.

SUMMARY OF THE INVENTION

As noted above, the present invention is a protective apparatus intended to be applied to an exterior portion of a vehicle, including a method for such application. More particularly, in the preferred mode, the invention is a series of polyvinyl chloride sheets or panels affixed to previously-determined places along the vehicle to protect the paint and finish located at such areas.

As such, one primary object of the present invention is to provide a method and apparatus for protecting an exterior surface of a vehicle that will overcome the shortcomings of prior art devices.

Another object of the present invention is to utilize clear and pliable molded materials to adhere to the exterior of the vehicle, to accomplish the above.

A further object is to alternatively utilize materials that are colored or include indicia thereon, to enhance or embellish upon the overall appearance of the invention and vehicle.

An important object of the present invention is to provide a method and apparatus for protecting an exterior surface of a vehicle, which may be easily removed from the vehicle without damage to the paint or surface thereof.

A further object of the present invention is to provide a method and apparatus for protecting an exterior surface of a vehicle, by utilizing sheets or panels that are specially molded to conform to the shape of particular vehicle parts and locations to which it is adhered.

According to the foregoing, it is an important object of the invention to provide for protective panels that are not limited in size, shape, or configuration.

It is also the object of the present invention to allow for one specific application of the above, wherein such panels are designed to be placed beneath a halter or "bra" cover of a vehicle, so as to protect the paint from damage caused by the halter.

It is a further object of the invention to provide panels designed to be placed beneath other vehicle protection products, so as to protect the paint from damage caused by such existing devices.

A further object of the invention is to provide sheets or panels which adhere to the surface of the vehicle via static electricity.

A further object of the invention is to provide sheets or panels of a size small enough to prevent air bubbles forming between the vehicle and the protective covering, while providing a strong enough bond to prevent the protective covering from falling off and make the protective covering easy and manageable to work with.

A still further object of the present invention is to provide a protective covering for vehicles that is economical in cost to manufacture.

Finally, it is an object of the invention to provide a method and apparatus for protection of a vehicle exterior portion, that is inexpensive to manufacture and may be produced with relative ease.

The novel features which are considered characteristic for the invention are set forth in the appended claims. The invention itself, however, both as to its construction and its method of operation, together with additional objects and advantages thereof, will be best understood from the following description of the embodiments when read and understood in connection with accompanying drawings.

BRIEF DESCRIPTION OF PREFERRED EMBODIMENTS

DETAILED DESCRIPTION OF THE PREFERRED EMBODIMENT

Figure 1:
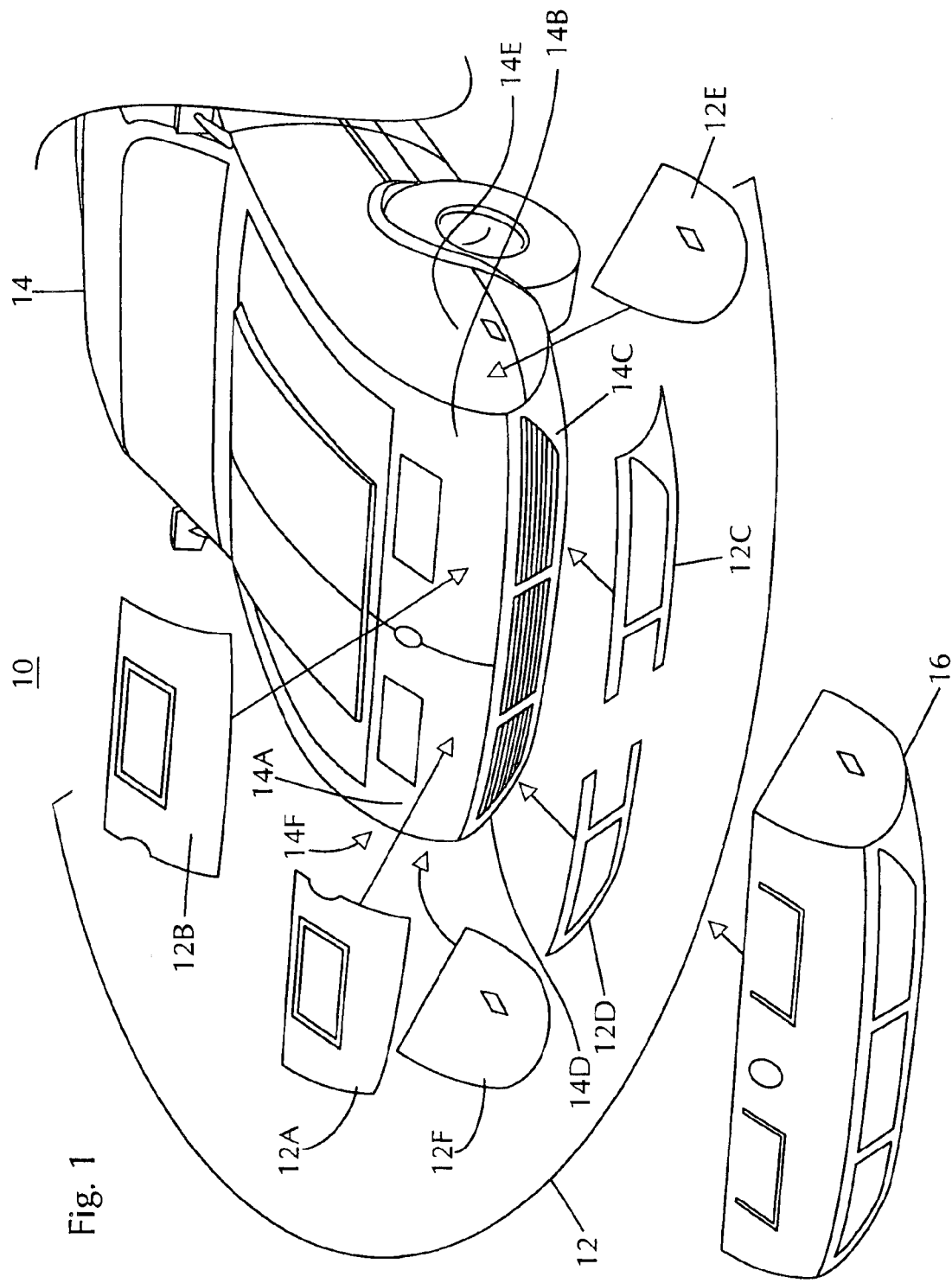
FIG. 1 is a three-quarter front perspective, exploded view of the present invention, illustrating the principal components and their general location of attachment in the preferred mode.
Figure 2B:
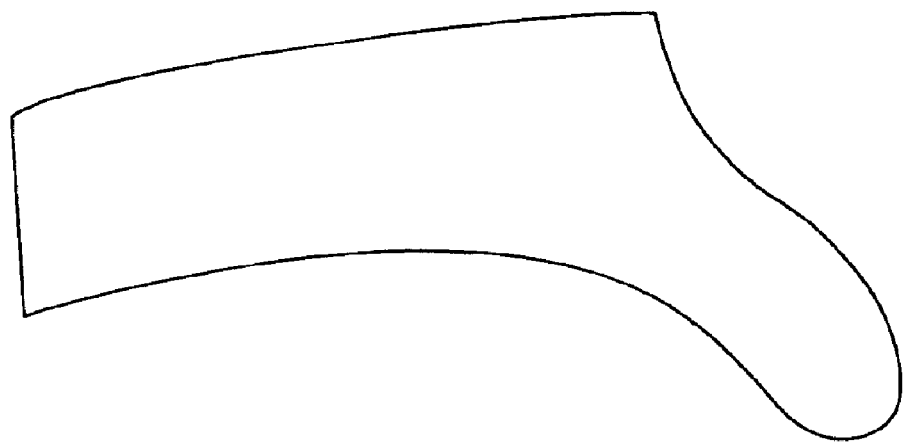
FIG. 2B is a front perspective view of one particular protective panel of the present invention, as designed for a particular make and model automobile, for the purposes of example only.
Figure 2A:
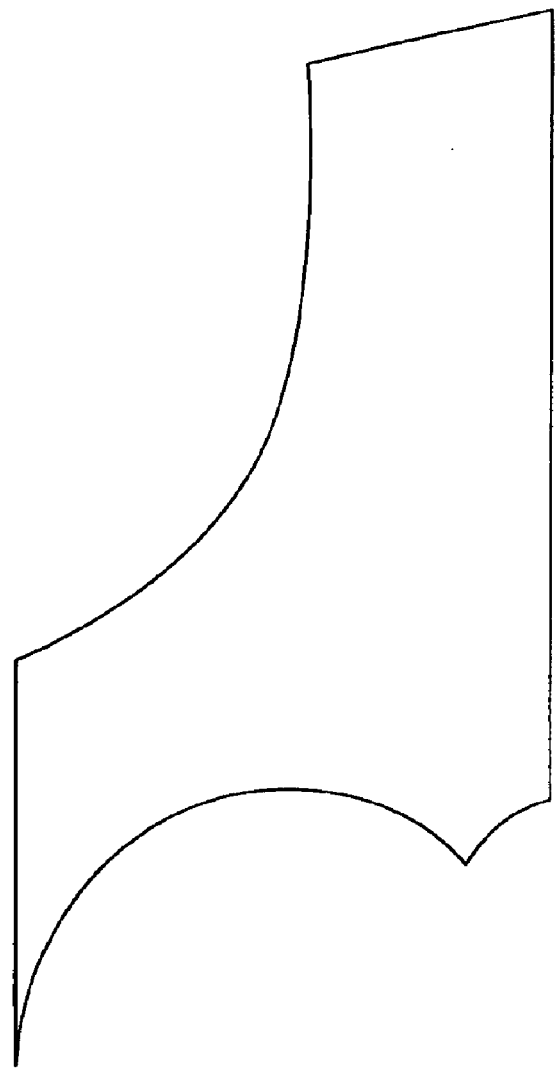
FIG. 2A is a front perspective view of one particular protective panel of the present invention, as designed for a particular make and model automobile, for the purposes of example only.

This description relates to the general comments above, as well as FIG. 1, which is a three-quarter front perspective, exploded view of the present invention, illustrating the principal components and their general location of attachment in the preferred mode, and FIGS. 2A and 2B, which are front perspective views of particular protective panels of the present invention, as designed for a particular make and model automobile, for the purposes of example only.

To describe the example of FIG. 1, the protective panel cover assembly (12) comprises a right hood protective member (12A), left hood protective member (12B), right nose protective member (12C), left nose protective member (12D), left side protective member (12E), and right side protective member (12F).

Such panel members directly correspond to the vehicle at locations identified as right hood portion (14A), left hood portion (14B), right nose portion (14C), left nose portion (14D), left side portion (14E), and right side portion (14F).

It is the intention of this unique embodiment of the present invention to allow any such panels of polyvinyl chloride material (12) to be specially placed upon the vehicle (14) to provide a much-needed barrier between a previously existing removable halter member (16) and the vehicle paint. It is well known that considerable damage is commonly caused to the vehicle paint in these specially selected areas due to the vinyl, plastic, nylon, or cotton halter (16) constantly rubbing against the vehicle exterior during vibration and wind. Thus, although the halter is intended to protect the vehicle paint and exterior surface, the halter itself causes damage thereto in particular locations, and therefore, a need exists to remedy such damage. The same theory holds true for a host of additional existing vehicle protection products, hence the present invention may also be used to provide a barrier between such other products and the vehicle itself. For the purposes of example, such additional existing products include mud flaps and hard, molded pieces that flair outwardly from the vehicle to protect the same from rocks and debris.

As such, the embodiment illustrated in FIG. 1 is considered a significant improvement over prior art vehicle protection devices, which typically protect only other portions of the vehicle, or require the usage of far more complex fasteners that fail to provide a conveniently attachable and removable cover means.

Importantly, the protective panels of the present invention are specially designed to correspond directly to selected areas of exact make and model vehicles, for the best fit and most effective protection. Thus, the protective panels may be of shapes shown in FIG. 2A (sample front protective panel) and FIG. 2B (sample front insert protective panel), or may be in a great variety of additional shapes and sizes as called for by each particular vehicle and its area to be protected.

Furthermore, unlike the prior art devices, the device of the present invention may be manufactured of a simple material such as polyvinyl chloride having a substantially high plasticizer concentration. Such allows for the convenient method of creating and adhering the protective members, as follows:

The user begins by forming a template by tracing the area to be protected. The template is then positioned over the above-mentioned pliable material used to form the protective covering. The user then either cuts the protective cover panel or panels to a shape substantially matching the traced pattern on the template, or uses a die that is previously created for ease in manufacture and mass production.

Next, if necessary, the protective cover is divided into pieces having a previously determined length and previously determined width, and the area to be protected is cleaned. Such cleaning may be performed by utilizing a solution that preserves the wax that may be on the vehicle. Importantly, the ratio utilized may be one drop of dishwashing soap to every eight ounces of water, though other ratios may be used if found to be effective.

In addition to the above, the user may dry the area to be protected prior to adhering the protective cover. The area may further be waxed and buffed, for best results. In addition, a compound may be utilized to better protect a damaged area, without interfering with the functionality of the present invention.

The user then grasps the protective cover panel and positions the same over the area to be protected. The user applies force in the direction of the area to be protected, which causes the protective cover to contact and adhere to the area to be protected. Such may be a sliding pressure to eliminate any air bubbles that may be present.

The liquid may be easily sprayed upon the area of the vehicle to be protected. The user holds the protective cover in place, and applies pressure to push out excess liquid by using an item such as a squeegee, towel, paper towel, credit card, or piece of cardboard.

The user then simply repeats the foregoing method with each protective cover panel, until the vehicle area to be protected is entirely covered by the protective members of the present invention.

Finally, it is important to note that a simple pulling force in a direction away from the vehicle functions to remove the protective cover from the vehicle, if desired by the user for any purpose.

With regards to all descriptions and graphics, while the invention has been illustrated and described as embodied, it is not intended to be limited to the details shown, since it will be understood that various omissions, modifications, substitutions and changes in the forms and details of the device illustrated and in its operation can be made by those skilled in the art without departing in any way from the spirit of the invention.

Without further analysis, the foregoing will so fully reveal the gist of the invention that others can readily adapt it for various applications without omitting features that, from the standpoint of prior art, constitute essential characteristics of the generic or specific aspects of this invention. What is claimed as new and desired to be protected by Letters Patent is set forth in the claims.

What is claimed is:

1. A covering for protecting an area of an exterior of a vehicle from damage due to debris and other objects contacting the vehicle, said protective covering including at least one section formed from a pliable material and having a previously determined length and a previously determined width, said section of said protective covering having a shape substantially matching a shape of the area being protected and able to retain a static charge, the at least one section comprising a left hood member, right hood member, left nose member, right nose member, left side member, and right side member;

the at least one section placed upon a nose area of the vehicle, beneath a previously existing removable halter cover of a vehicle, functioning to provide a barrier between the halter and vehicle paint to protect the paint from damage caused by the halter due to vibration and wind;

the covering functioning to allow the section to removably adhere to the area being protected, wherein said the length and width of each of each section of said protective cover provides an adherence force for retaining the at least one section in a position covering the area to be protected; and the covering specifically designed to protect vehicles of any manufacture, make, model, and year.

2. The protective covering for vehicles as recited in claim 1, wherein the covering is utilized in conjunction with the halter that is constructed of a material selected from the group consisting of vinyl, plastic, nylon, and cotton.

3. The protective covering for vehicles as recited in claim 1, wherein said protective covering has a thickness within a range of substantially 4 mil. to 16 mil.

4. The protective covering for vehicles as recited in claim 1, wherein said pliable material is manufactured of polyvinyl chloride.

5. A method of using the covering for protecting a nose area of an exterior of a vehicle from damage due to debris and other objects contacting the vehicle, comprising the steps of:

a) forming a template by tracing the area to be protected;
   b) positioning the template over a pliable material used to form the protective covering;
   c) adapting the protective cover to a shape substantially matching the traced pattern on the template through usage of a previously formed die;
   d) dividing the protective cover into pieces having a previously determined length and previously determined width;
   e) thoroughly washing the nose area;
   f) applying a compound to the nose area if same is oxidized and abused;
   g) waxing and buffing the nose area;
   h) spraying the nose area with a previously-determined liquid;
   i) grasping the protective cover and positioning the protective cover over the nose area;
   j) applying force in direction of the nose area causing the protective cover to contact and adhere to the nose area;
   k) holding the protective cover in place, and applying pressure to push out excess liquid through usage of a previously-determined item;
   l) allowing the nose area to dry;
   m) installing a halter cover over the protective cover; and
   n) applying a pulling force in a direction away from the vehicle to remove the protective cover from the vehicle.

6. The method described in claim 5, wherein the protective cover is adapted to a shape substantially matching the traced pattern on the template by cutting manually.

7. The method described in claim 5, wherein the previously-determined liquid is a mix of water and a small drop of dishwashing soap.

8. The method described in claim 7, wherein the ratio of water to dishwashing soap is 8 ounces of water to 1 drop of dishwashing soap.

9. The method described in claim 7, wherein the mix of water and dishwashing soap is mixed by swirling a spray bottle containing the water and dishwashing soap.

10. The method described in claim 5, wherein the previously-determined item is selected from the group consisting of a squeegee, towel, paper towel, credit card, and piece of cardboard.

* * * * *